May 23, 1939.  W. I. JONES  2,159,383

SLIP COVER INSTALLATION AND FASTENER FOR THE SAME

Filed April 13, 1937

Inventor:
Walter I. Jones

Patented May 23, 1939

2,159,383

UNITED STATES PATENT OFFICE 2,159,383

SLIP COVER INSTALLATION AND FASTENER FOR THE SAME

Walter I. Jones, Arlington, Mass., assignor to United-Carr Fastener Corporation, Cambridge, Mass., a corporation of Massachusetts Application April 13, 1937, Serial No. 136,663

1 Claim. (Cl. 24—259)

My invention relates to slip cover installations and clip members for the same.

An object of my invention is to provide an improved clip member of a simple and inexpensive construction which is adapted to secure a slip cover to one side of a panel structure.

Other objects and uses of my invention will be apparent from inspection of the drawing and specification hereinbelow set forth.

Referring to the drawing, in which I have illustrated a preferred embodiment of my invention:

Figure 1:
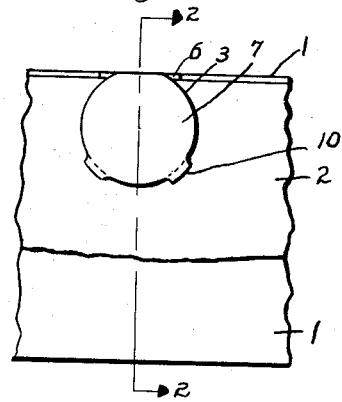
Figure 1 is a front elevational view of a portion of a complete installation showing the relation of the parts with a portion of the clip member in final clamping engagement with a panel device and securing a slip cover thereto.

The specific installation which I have selected for purposes of illustrating my invention is that of a slip cover applied to the outer surface of an upholstery panel such as commonly used in automobile body construction. In the usual automobile body construction the upholstery panel is secured to the door frame so as to cover the door frame on the inside of the automobile. The slip cover is secured to the outer side of the upholstery panel for the purpose of protecting the panel against stain and injury.

Referring now particularly to the drawing, I have shown a preferred installation comprising a supporting structure 1, which may be the framework of an automobile door, a panel device such as an upholstery panel secured to the support 1, and a slip cover 2 covering the outer surface of the upholstery panel and secured to the panel by means of my fastener clip member 3. The upholstery panel may be of usual construction including a backing 4 covered on its outer side by suitable cloth material 5. By reason of the fact that my improved clip member is particularly useful for purposes of attaching a slip cover to an upholstery panel which has been preassembled with an automobile door frame, I prefer to describe it in connection with such an installation although there are many other uses to which my fastener could be directed which would fall within the spirit of this invention.

Figure 4:
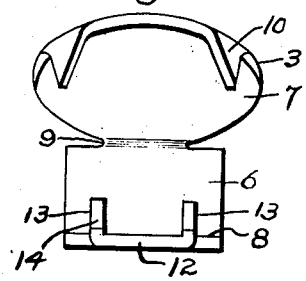
Fig. 4 is an end view of my fastener member before attachment.
Figure 5:
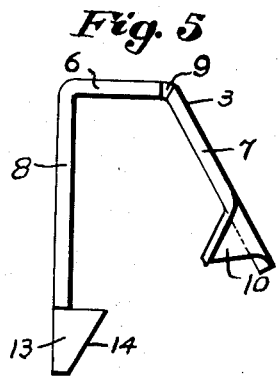
Fig. 5 is a side view of the clip member shown in Fig. 4.
Figure 6:
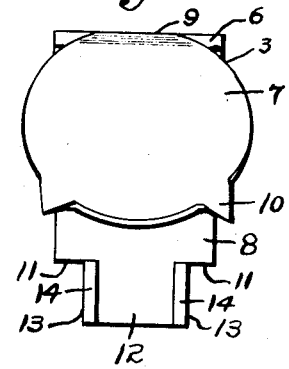
Fig. 6 is a front view of the clip member shown in Figs. 4 and 5.

Referring in detail to my fastener member per se, I have illustrated in Figs. 4-6, a clip member made of one piece of sheet metal having a substantially U shape. My clip member comprises a base portion 6 which has an upper flange portion 7 and a lower flange portion 8 extending therefrom. The upper flange portion 7, which serves as a clamping portion, is joined, in my preferred form, to the base 6 by a neck portion 9 (Figs. 4 and 5), which is of less width than either the flange 7 or the base 6, for the purpose of facilitating bending of the flange 7 relative to the flange 8. The flange portion 7 normally extends from the base 6 in such a way that the plane of the flange is in spaced diverging relation to the plane of the base 8 enabling the clip member to be slipped over the edge of an upholstery panel in a manner to be described. Attaching prongs 10 extend from the outer edge of the flange 7 toward the flange 8 for the purpose of securing the slip cover to the upholstery panel.

The lower flange 8 is preferably of rectangular shape and has notches 11—11 in opposed sides at the free end thereof (Fig. 6) forming an end portion 12 disposed between the notches. The notches 11—11 are formed through reason of taking material from the blank of the flange 8 to form attaching prongs 13. The prongs 13 are integral with opposed sides of the end portion 10 and extend upwardly therefrom in the direction of the upper flange 7 for the purpose of engaging the inner side of the panel device to maintain the clip member in assembly with the panel prior to applying the slip cover to the outer side of the panel for the purpose of securing it thereto. Opposed broad surfaces of the prongs 13 lie in planes which are disposed in substantially parallel relation one with another and in substantially perpendicular relation to the plane of the base portion 6 (Fig. 6). In order that the flange 8 may be quickly and easily inserted between the support and the upholstery panel which has been pre-assembled therewith, I have shaped the prongs 13 so that a narrow edge 14 of the same slants upwardly away from the free end of the flange portion 8 in the direction of the base portion 6. The narrow edge 14 extends, in my preferred form, from adjacent the plane of the flange 8 at the outer end of the prong to the greatest height of the prong at the inner end of the same, as most clearly shown in Fig. 5. As a result of this construction, an inclined lead is provided enabling the lower flange 8 to be moved between the inner face of the upholstery panel and the support without causing undue friction between the parts.

Figure 2:
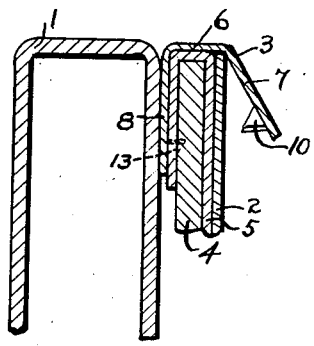
Fig. 2 is a section taken along the line 2—2 of Fig. 1 showing the relation of the parts before a clamping portion of the clip member is moved into final fastening position.
Figure 3:
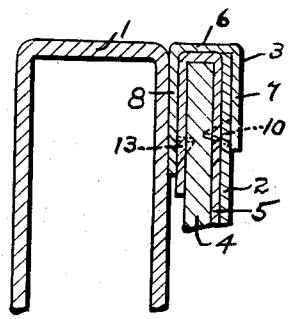
Fig. 3 is a section similar to that shown in Fig. 2 except that the clamping portion of the clip member is in final fastening position.

Assembly of the parts of my installation is easily carried out through first moving the lower flange 8 between the supporting structure 1 and the upholstery panel 2 until the base portion 6 of the clip member substantially abuts the edge of the upholstery panel, at which time the upper flange 7 will be disposed in superposed spaced relation to the outer side of the panel, as most clearly shown in Fig. 2. This movement of the lower flange portion 8 between the parts is carried out with a minimum of effort through reason of the fact that the side of the flange 8 facing the supporting structure presents a relatively smooth surface and leads are provided on the edges of the attaching prongs 13 facing the upholstery panel structure. When the clip member is in the aforesaid first position, the outermost ends of the attaching prongs 13 may penetrate the backing of the upholstery panel (Figs. 2 and 3) to enable the clip member to be more securely attached thereto. When the clip member is in this position it cannot come loose and the slip cover 2 may be inserted between the upper flange 7 and the upholstery panel (Fig. 2). Finally, the upper flange 7 is forced against the slip cover by any suitable means and the prongs 10 pierce the slip cover and enter into the backing 4 of the upholstery panel (Fig. 3) thereby securely holding the slip cover at the upper edge of the upholstery panel, as clearly shown in Fig. 3. Through reason of the fact that the upper flange 7 is joined to the base portion 6 by the reduced neck portion 9, the upper flange is readily bent into the engaging position shown in Fig. 3, and during the bending action the lower flange 8 and base 6 remain in proper fixed position relative to the assembly. With the aforesaid construction of my clip member, the material of the slip cover can be tightly clamped to the outer face of a part even though the part has already been secured to another structure. For this reason my clip member is advantageous over clip members now known in the art which are so designed that it is difficult and impractical to apply them to an edge of a part for securing a slip cover thereto after attachment of that part to another structure.

Thus by my invention I have provided a fastener of simple construction capable of efficiently carrying out desired purposes in connection with parts such as those herein illustrated and described and also other parts.

Although I have illustrated and described a preferred embodiment of my invention, I do not wish to be limited thereby because the scope of my invention is best defined by the following claim.

I claim:

A substantially U-shaped bendable clip member formed from a single piece of soft metal and comprising a base portion, spaced upper and lower flange portions extending from said base portion, attaching prongs extending from said upper flange toward said lower flange, said lower flange having attaching prongs extending from its edges toward said upper flange, said prongs having broad surfaces lying in parallel planes one with another and in the line of pull exerted on said prongs when said clip is attached, said planes being in substantially perpendicular relation to the plane of said base portion, and each of said prongs having a narrow edge slanting upwardly from a point substantially adjacent said lower flange at the outer end of said prong toward the highest point of said prong thereby making it easy to guide said prongs between two parts when said lower flange is inserted between them.

WALTER I. JONES.